United States Patent
Chung

(10) Patent No.: US 9,524,744 B1
(45) Date of Patent: Dec. 20, 2016

(54) DISC DRIVE WITH A BUFFER PORTION FOR REDUCING AN EJECTION SPEED OF A TRAY

(71) Applicants: LITE-ON ELECTRONICS (GUANGZHOU) LIMITED, Guangzhou (CN); LITE-ON TECHNOLOGY CORPORATION, Taipei (TW)

(72) Inventor: Ming-Hung Chung, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/057,096

(22) Filed: Feb. 29, 2016

(30) Foreign Application Priority Data

Dec. 29, 2015 (TW) .............................. 104144280 A

(51) Int. Cl.

| G11B 17/04 | (2006.01) |
|---|---|
| G11B 17/056 | (2006.01) |
| G11B 17/047 | (2006.01) |
| G11B 17/044 | (2006.01) |
| G11B 17/053 | (2006.01) |

(52) U.S. Cl.
CPC ........... *G11B 17/056* (2013.01); *G11B 17/044* (2013.01); *G11B 17/047* (2013.01); *G11B 17/0407* (2013.01); *G11B 17/053* (2013.01)

(58) Field of Classification Search
CPC ..... G11B 17/056; G11B 17/035; G11B 17/04; G11B 17/0407; G11B 17/044; G11B 17/047; G11B 17/05; G11B 17/053
USPC .......................................... 720/602, 611, 613
See application file for complete search history.

(56) References Cited

U.S. PATENT DOCUMENTS

| 4,893,295 | A | * | 1/1990 | Matsuura | ............. | G11B 17/056 369/265 |
|---|---|---|---|---|---|---|
| 5,195,078 | A | * | 3/1993 | Ikedo | ................... | G11B 17/056 360/99.07 |
| 5,784,344 | A | * | 7/1998 | Ahn | ....................... | G11B 17/30 369/30.9 |
| 6,654,335 | B2 | * | 11/2003 | Ming-Hui | ............ | G11B 33/121 360/99.02 |
| 7,143,423 | B2 | * | 11/2006 | Arase | ................... | G11B 17/056 720/602 |
| 7,207,050 | B2 | * | 4/2007 | Makino | ................ | G11B 17/056 720/613 |
| 7,328,441 | B2 | * | 2/2008 | Tsao | ..................... | G11B 17/051 720/601 |
| 7,334,239 | B2 | * | 2/2008 | Kobayashi | ............. | G11B 17/05 720/602 |
| 7,437,744 | B2 | * | 10/2008 | Yang | .................... | G11B 17/056 720/607 |

(Continued)

*Primary Examiner* — Brian Miller
(74) *Attorney, Agent, or Firm* — Rabin & Berdo, P.C.

(57) ABSTRACT

A disc drive including a frame, a tray, a movable element and a buffer portion is provided. The tray is slidably disposed in the frame and includes a sliding groove. The movable element includes a protrusion slidably disposed on the sliding groove. The buffer portion is disposed adjacent to an end of the sliding groove. During the disc ejecting process, the protrusion contacts the buffer portion, to reduce the tray ejection speed.

7 Claims, 4 Drawing Sheets

(56) References Cited

U.S. PATENT DOCUMENTS

| | | | | |
|---|---|---|---|---|
| 7,492,674 B2* | 2/2009 | Kimura | ............... | G11B 17/056 369/30.36 |
| 8,104,050 B2* | 1/2012 | Hamaie | ............... | G11B 17/056 369/268 |
| 8,185,919 B2* | 5/2012 | Murata | ............... | G11B 17/056 720/602 |
| 2013/0139189 A1* | 5/2013 | Yamasaki | ............ | G11B 17/056 720/613 |

* cited by examiner

DISC DRIVE WITH A BUFFER PORTION FOR REDUCING AN EJECTION SPEED OF A TRAY

This application claims the benefit of Taiwan application Serial No. 104144280, filed Dec. 29, 2015, the disclosure of which is incorporated by reference herein in its entirety.

TECHNICAL FIELD

The disclosure relates in general to a disc drive, and more particularly to a disc drive having a buffer portion.

BACKGROUND

During the final stage of tray ejection of a conventional disc drive, normally the tray ejection speed is reduced to avoid the tray violently colliding with the frame which may easily cause the disc to come off the tray. The conventional disc drive normally has an electronic switch (such as a limit switch) for implementing the said function. For example, when the electronic switch is activated during the disc ejecting process, the motor for driving the tray starts to brake to slow down the speed of the tray to the terminal end. However, the electronic switch not only incurs extra cost but further occupies a space in the disc drive.

Therefore, it has become a prominent task for the industries to provide a solution capable of reducing tray ejection speed.

SUMMARY

The disclosure is directed to a disc drive capable of reducing an ejection speed of the tray.

According to one embodiment, a disc drive including a frame, a tray, a movable element and a buffer portion is provided. The tray is slidably disposed in the frame and includes a sliding groove. The movable element includes a protrusion slidably disposed on the sliding groove. The buffer portion is disposed adjacent to an end of the sliding groove. During the disc ejecting process, the protrusion contacts the buffer portion to reduce the tray ejection speed.

The above and other aspects of the invention will become better understood with regard to the following detailed description of the preferred but non-limiting embodiment(s). The following description is made with reference to the accompanying drawings.

Figure 1:
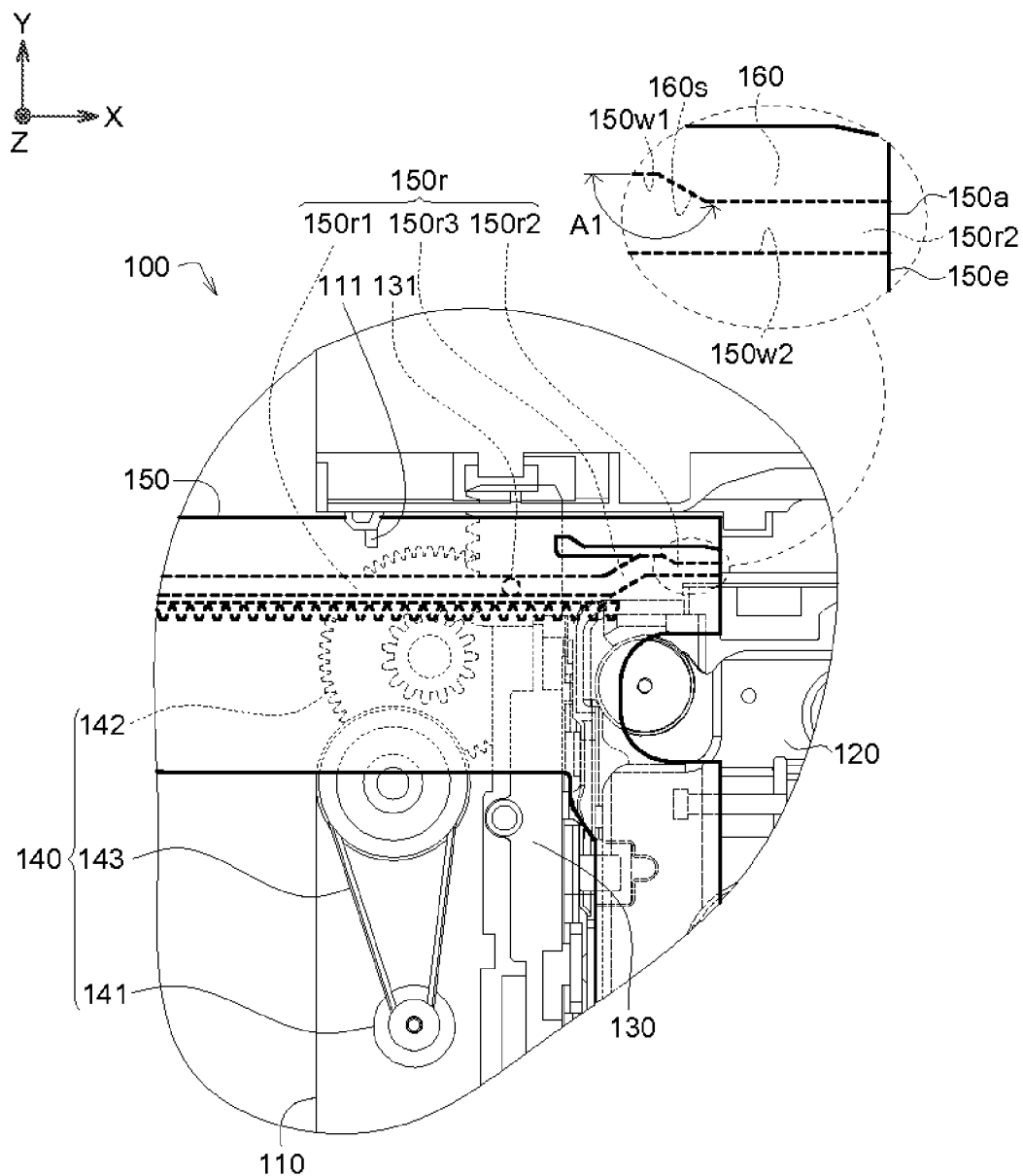
FIG. 1 is a partial top view of a disc drive according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
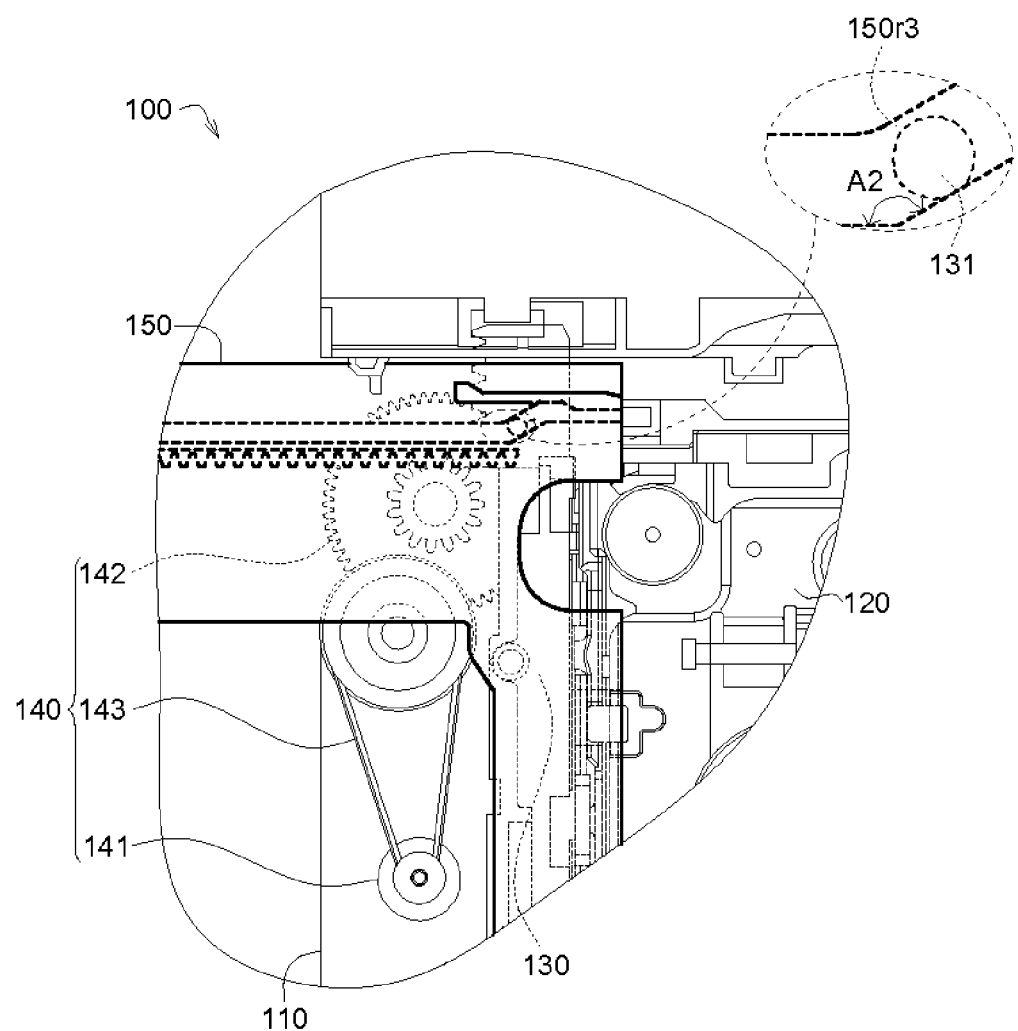
FIG. 2 is a top view of the protrusion of FIG. 1 sliding in a third sub-sliding groove.
Figure 3:
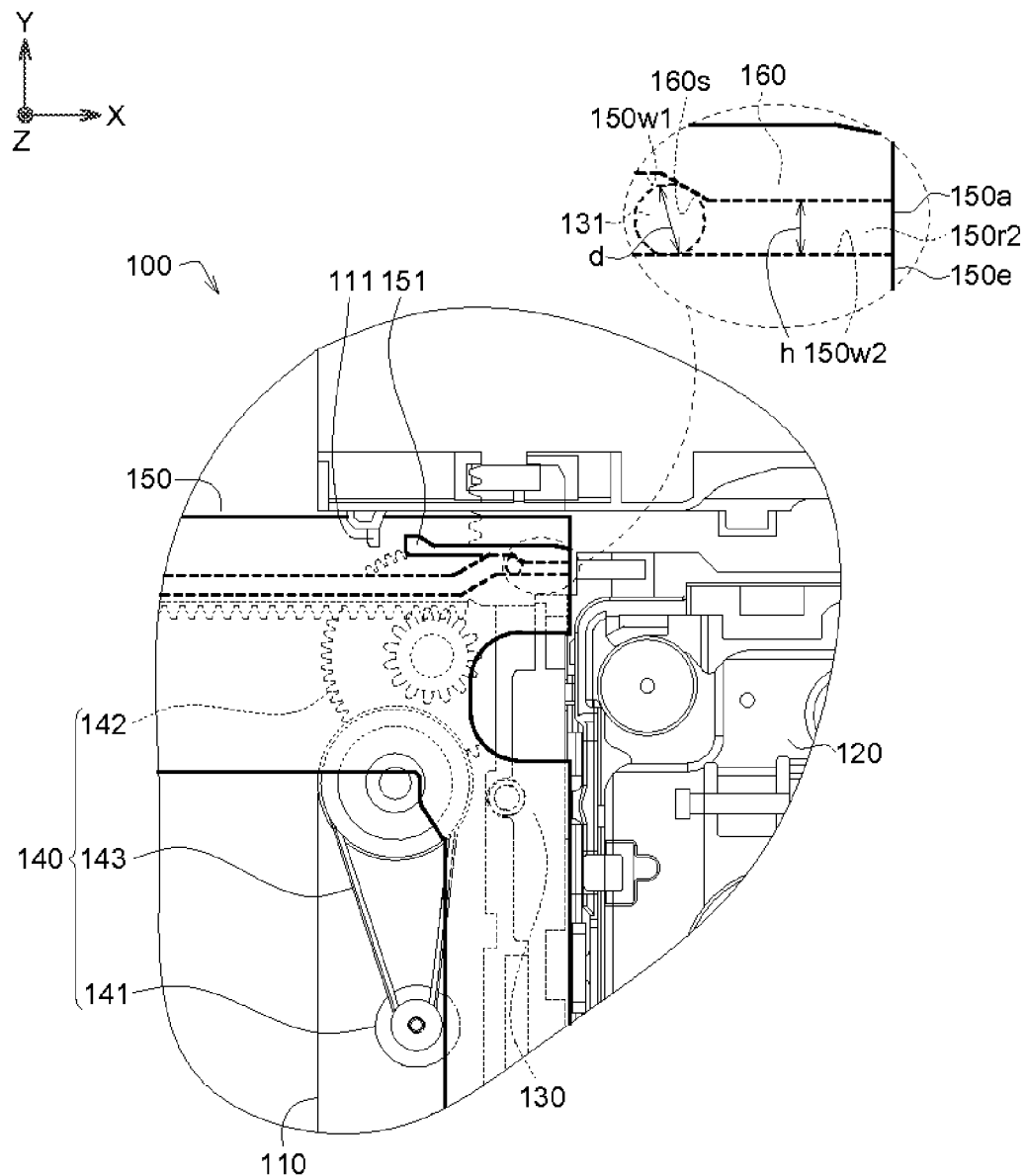
FIG. 3 is a top view of the protrusion of FIG. 2 stopped by a buffer portion.

Referring to FIG. 1 to FIG. 3, processes of ejecting a tray according to an embodiment of the present invention are shown.

FIG. 1 is a partial top view of a disc drive 100 according to an embodiment of the present invention. The disc drive 100 includes a frame 110, a traverse module 120, a movable element 130, a driving mechanism 140, a tray 150 and a buffer portion 160.

The traverse module 120, the movable element 130, the driving mechanism 140 and the tray 150 are disposed inside the frame 110, wherein the tray 150 is slidably disposed in the frame 110 and slides reciprocatively along the X axis direction.

The movable element 130 connects the traverse module 120. The driving mechanism 140 includes a drive member 141, a gear set 142 and a belt 143. The drive member 141 can be realized by a direct current motor. The belt 143 connects the drive member 141 and the gear set 142, and the gear set 142 is connected to the tray 150, such that the drive member 141 can drive the tray 150 to slide reciprocatively along the X axis direction through the belt 143 and the gear set 142. Besides, the gear set 142 also connects the movable element 130, such that the drive member 141 can drive the movable element 130 to slide reciprocatively along the Y axis direction through the belt 143 and the gear set 142. The movable element 130 has a guide groove (not illustrated) connected to the traverse module 120. When the movable element 130 slides along the Y axis direction, the traverse module 120 also moves along the Z axis direction.

For example, during the disc loading process, the gear set 142 is driven by the drive member 141 and the belt 143 and makes the movable element 130 move towards the −Y axis direction. Meanwhile, the tray 150 enters the frame 110 along the +X axis direction to be disposed above the traverse module 120. Then, the traverse module 120 connected to the guide groove of the movable element 130 will ascend toward the +Z axis direction to clamp the disc (not illustrated) located on the tray 150. Also, during the disc ejecting process, the gear set 142 is driven by the drive member 141 and the belt 143 and makes the movable element 130 slide towards the +Y axis direction. Meanwhile, the traverse module 120 will descend towards the −Z axis direction to release the disc on the tray 150, and the tray 150 is ejected from the frame 110 towards the −X axis direction for the disc to be conveniently unloaded.

The movable element 130 includes a protrusion 131 and the tray 150 includes a sliding groove 150r, wherein the protrusion 131 is slidably disposed on the sliding groove 150r. The sliding groove 150r includes a first sub-sliding groove 150r1, a second sub-sliding groove 150r2 and a third sub-sliding groove 150r3, wherein the third sub-sliding groove 150r3 connects the first sub-sliding groove 150r1 and the second sub-sliding groove 150r2 and the first sub-sliding groove 150r1 and the second sub-sliding groove 150r2 are parallel to each other. The second sub-sliding groove 150r2 is closer to an edge 150e of the tray 150 facing towards the traverse module 120 than the first sub-sliding groove 150r1. The third sub-sliding groove 150r3 slantingly connects the first sub-sliding groove 150r1 and the second sub-sliding groove 150r2.

The buffer portion 160 is protruded from the first wall surface 150w1 of the sliding groove 150r and is disposed adjacent to an end of the sliding groove 150r. For example, the buffer portion 160 is located at an end 150a of the second sub-sliding groove 150r2. In an embodiment, the buffer portion 160 and the tray 150 are integrally formed in one piece, and can be formed of the same or different materials. For example, the buffer portion 160 and the tray 150 are formed of plastics. In another embodiment, the buffer portion 160 and the tray 150 can be two independently manufactured elements formed of the same or different materials. For example, the buffer portion 160 can be adhered on an end of the sliding groove 150r by way of adhesion. The buffer portion 160 has a side surface 160s, which can be realized by a slantwise plane. The angle A1 formed by the side surface 160s of the buffer portion 160 and the first wall surface 150w1 is larger than 90° (an obtuse angle) or substantially equivalent to 90°. In another embodiment, two buffer portions can be oppositely disposed on the first wall surface 150w1 and the second wall surface 150w2 of the sliding groove 150r, respectively. The two buffer portions can have identical or different structures.

During the disc ejecting process, before the protrusion 131 enters the first sub-sliding groove 150r1, the traverse module 120 is already in a descent position for releasing the disc. As indicated in FIG. 1, during the process in which the driving mechanism 140 continues to eject the tray 150 towards the −X axis direction, the protrusion 131 enters the first sub-sliding groove 150r1 and slides in the first sub-sliding groove 150r1.

FIG. 2 is a top view of the protrusion 131 of FIG. 1 sliding in a third sub-sliding groove 150r3. During the disc ejecting process in which the driving mechanism 140 continues to eject the tray 150 towards the −X axis direction, the protrusion 131 enters and contacts the third sub-sliding groove 150r3. When the driving mechanism 140 continues to operate, the groove wall of the third sub-sliding groove 150r3 moves the movable element 130 towards the limit position in the +Y axis direction.

Since the angle A2 formed between the groove wall of the third sub-sliding groove 150r3 and the groove wall of the first sub-sliding groove 150r1 is an obtuse angle, the protrusion 131 will not violently collide with the groove wall of the third sub-sliding groove 150r3. Instead, the protrusion 131 will gradually enter the second sub-sliding groove 150r2 through the first sub-sliding groove 150r1.

FIG. 3 is a top view of the protrusion 131 of FIG. 2 stopped by the buffer portion 160. During the disc ejecting process in which the driving mechanism 140 continues to eject the tray 150 towards the −X axis direction, the protrusion 131 enters the second sub-sliding groove 150r2 and contacts the buffer portion 160. The buffer portion 160 can absorb the advancing force of the protrusion 131, and slow down the ejection speed of the tray 150. Meanwhile, the tray 150 completes the disc ejecting process, such that the disc on the tray 150 can be smoothly unloaded. In another embodiment, based on the position and/or size of the buffer portion 160, the protrusion 131 can contact the buffer portion 160 before entering the second sub-sliding groove 150r2.

Since the side surface 160s of the buffer portion 160 is a slantwise plane, the force by which the protrusion 131 contacts the buffer portion 160 can be gradually or smoothly absorbed, and the ejection speed of the tray 150 can be gradually reduced (to generate a slow braking effect). Furthermore, since the interval h between the buffer portion 160 and the second wall surface 150w2 of the second sub-sliding groove 150r2 is smaller than the outer diameter d of the protrusion 131, the protrusion 131 will not pass through the interval h and come off the second sub-sliding groove 150r2.

As indicated in FIG. 3, the tray 150 has a first stopping portion 151, and the frame 110 has a second stopping portion 111. The first stopping portion 151 and the second stopping portion 111 are located on the sliding path of the tray 150. Due to the buffer portion 160, before the first stopping portion 151 collides with the second stopping portion 111, the protrusion 131 is already stopped by the buffer portion 160, and the ejection speed of the tray 150 is reduced during the final stage of tray ejection to avoid the first stopping portion 151 violently colliding with the second stopping portion 111. In other words, if the first stopping portion 151 violently collides with the second stopping portion 111, the tray 150 may wobble severely and make the disc come off the tray 150. The design of the disc drive 100 of present invention embodiment is capable of resolving or avoiding the said problem.

Figure 4:
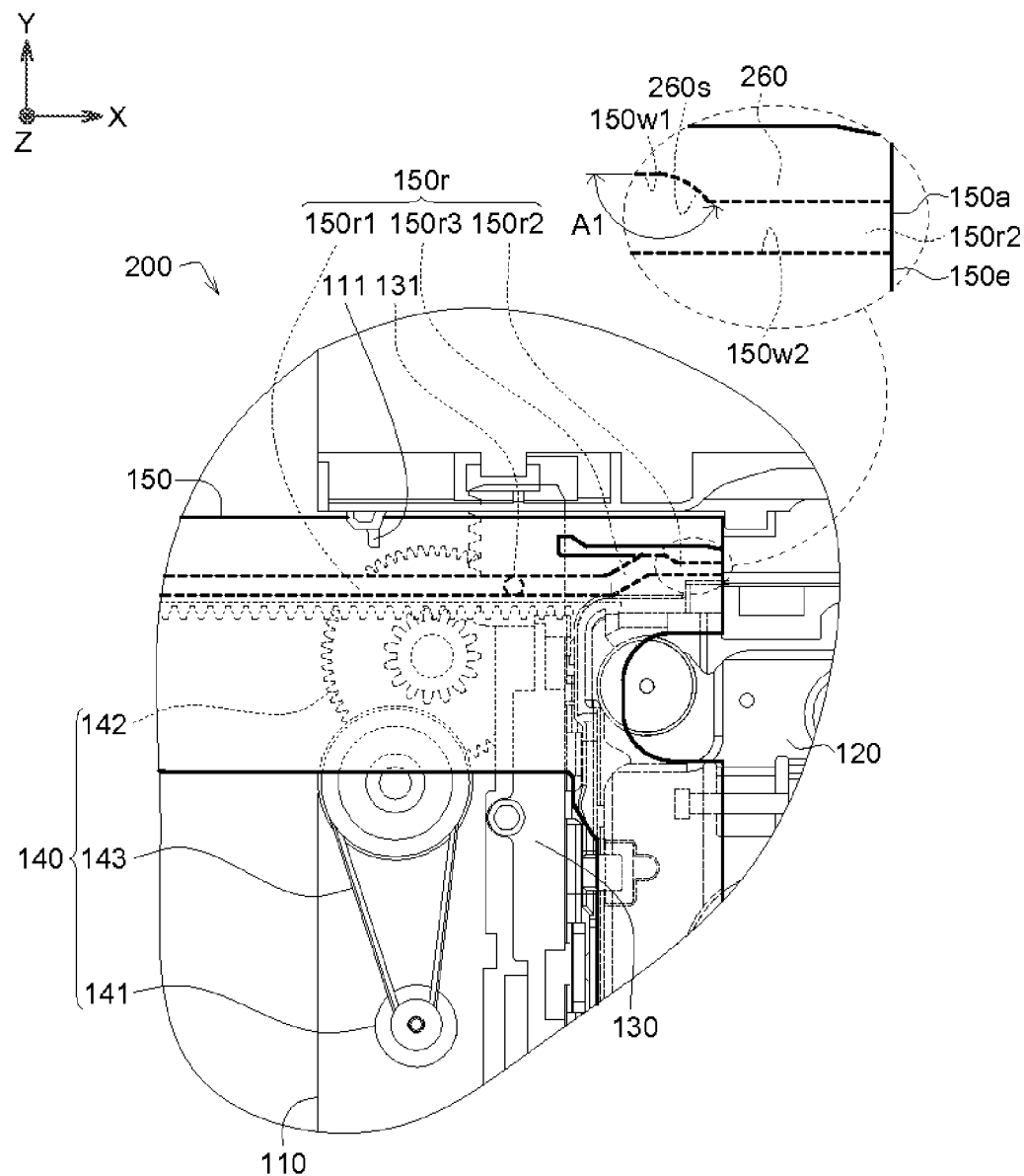
FIG. 4 is a partial top view of a disc drive according to another embodiment of the present invention.

FIG. 4 is a partial top view of a disc drive 200 according to another embodiment of the present invention. The disc drive 200 includes a frame 110, a traverse module 120, a movable element 130, a driving mechanism 140, a tray 150 and a buffer portion 260. The disc drive 200 of the present embodiment is different from the disc drive 100 of previous embodiment in that the side surface 260s of the buffer portion 260 of the present embodiment is a curved surface. For example, the side surface 260s can be realized by a concave surface or a convex surface.

Also, the buffer portion can be designed as a deformable/elastic structure. When the protrusion 131 contacts the buffer portion, the buffer portion will be deformed to absorb the advancing force of the protrusion 131, such that the tray 150 can be slowly ejected from the disc drive.

To summarize, due to the design of the buffer portion, the tray ejection speed is smoothly reduced during the final stage of tray ejection to avoid the disc coming off the tray. Furthermore, the electronic switch can be dispensed with, such that the cost of disc drive can be reduced and the internal space of disc drive can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A disc drive, comprising:
   a frame;
   a tray slidably disposed in the frame and comprising a sliding groove;
   a movable element comprising a protrusion slidably disposed on the sliding groove; and
   a buffer portion disposed adjacent to an end of the sliding groove and protruding from a first wall surface of the sliding groove;
   wherein during a disc ejecting process of the disc drive, the protrusion contacts the buffer portion to reduce an ejection speed of the tray.

2. A disc drive, comprising:
   a frame;
   a tray slidably disposed in the frame and comprising a sliding groove;
   a movable element comprising a protrusion slidably disposed on the sliding groove; and
   a buffer portion disposed adjacent to an end of the sliding groove so that during a disc electing process of the disc drive, the protrusion contacts the buffer portion to reduce an election speed of the tray,
   wherein the sliding groove has a first wall surface and a second wall surface opposite to the first wall surface, the buffer portion protrudes from the first wall surface of the sliding groove, and an interval between the buffer portion and the second wall surface is smaller than an outer diameter of the protrusion.

3. The disc drive according to claim 1, wherein the buffer portion and the tray are integrally formed in one piece.

4. A disc drive, comprising:
- a frame;
- a tray slidably disposed in the frame and comprising a sliding groove;
- a movable element comprising a protrusion slidably disposed on the sliding groove; and
- a buffer portion disposed adjacent to an end of the sliding groove so that during a disc electing process of the disc drive, the protrusion contacts the buffer portion to reduce an election speed of the tray,
- wherein the sliding groove comprises:
- a first sub-sliding groove;
- a second sub-sliding groove closer to an edge of the tray than the first sub-sliding groove; and
- a third sub-sliding groove slantingly connecting the first sub-sliding groove and the second sub-sliding groove;
- wherein the buffer portion is located on the second sub-sliding groove.

5. The disc drive according to claim 1, wherein the buffer portion has a side surface which can be realized by a slantwise plane or a curved surface.

6. The disc drive according to claim 1, wherein the buffer portion is a deformable structure, and the buffer portion is deformed when contacted by the protrusion.

7. A disc drive, comprising:
- a frame;
- a tray slidably disposed in the frame and comprising a sliding groove;
- a movable element comprising a protrusion slidably disposed on the sliding groove; and
- a buffer portion disposed adjacent to an end of the sliding groove so that during a disc electing process of the disc drive, the protrusion contacts the buffer portion to reduce an election speed of the tray,
- wherein the buffer portion is disposed on a first wall surface of the sliding groove and has a side surface forming an obtuse angle with the first wall surface.

\* \* \* \* \*